United States Patent
Breyer et al.

(10) Patent No.: US 9,239,069 B2
(45) Date of Patent: Jan. 19, 2016

(54) ADHESIVE-COATED DOWEL

(75) Inventors: Robert A. Breyer, Atlanta, GA (US); Bobby L. Williamson, Conyers, GA (US); Steven O. Clausen, Roseburg, OR (US); Daniel Tingley, Oregon City, OR (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 660 days.

(21) Appl. No.: 13/428,766

(22) Filed: Mar. 23, 2012

(65) Prior Publication Data

US 2012/0263522 A1 Oct. 18, 2012

Related U.S. Application Data

(60) Provisional application No. 61/467,768, filed on Mar. 25, 2011.

(51) Int. Cl.
| | |
|---|---|
| *F16B 13/14* | (2006.01) |
| *C08G 8/10* | (2006.01) |
| *C09J 161/06* | (2006.01) |
| *F16B 11/00* | (2006.01) |

(52) U.S. Cl.
CPC .............. *F16B 13/141* (2013.01); *C08G 8/10* (2013.01); *C09J 161/06* (2013.01); *F16B 13/142* (2013.01); *A47B 2230/004* (2013.01); *F16B 11/006* (2013.01); *Y10T 403/553* (2015.01)

(58) Field of Classification Search
CPC ... F16B 13/141; F16B 13/142; F16B 15/0092
USPC .......................................................... 411/82
See application file for complete search history.

(56) References Cited

U.S. PATENT DOCUMENTS

| | | | | |
|---|---|---|---|---|
| 3,612,803 | A * | 10/1971 | Klaas ............................ | 219/633 |
| 4,710,539 | A * | 12/1987 | Siadat et al. .................... | 525/59 |
| 5,338,569 | A | 8/1994 | Hatch | |
| 5,650,210 | A * | 7/1997 | Fujii et al. ....................... | 428/57 |
| 6,254,301 | B1 * | 7/2001 | Hatch ........................... | 403/298 |
| 6,267,527 | B1 | 7/2001 | Miller | |
| 6,543,976 | B1 * | 4/2003 | Malofsky et al. ............... | 411/82 |
| 6,871,681 | B2 | 3/2005 | Miller | |
| 8,689,516 | B2 * | 4/2014 | Richardson et al. ......... | 52/655.1 |
| 2008/0115699 | A1 | 5/2008 | Miller et al. | |
| 2009/0047092 | A1 * | 2/2009 | Peffer ........................... | 411/257 |
| 2014/0199135 | A1 * | 7/2014 | Hable et al. ................... | 411/500 |

* cited by examiner

*Primary Examiner* — Flemming Saether
(74) *Attorney, Agent, or Firm* — Ram W. Sabnis

(57) ABSTRACT

A dowel coated with a heat-activated, B-staged formaldehyde-based resin and a related method of using the resin-coated dowel for joining separate components together.

20 Claims, 2 Drawing Sheets

ADHESIVE-COATED DOWEL

FIELD OF THE INVENTION

The present invention broadly relates to a dowel coated with a heat-activated, B-staged formaldehyde-based resin and to a related method of using the resin-coated dowel for joining separate components together.

BACKGROUND OF THE INVENTION

In manufacturing cabinets, shelving, scaffolding, furniture, and other articles from wood or wood-like materials, adjoining components or pieces of wood are often secured together with dowels and often an adhesive, such as woodworking glue. Conventionally, dowels have been made of wood, but metal and plastic dowels also are known.

In common use, openings or dowel receiving cavities (i.e., the female member) are formed in each of the respective components, e.g. pieces of wood or wood-like material, which are to be joined together. When the pieces of wood or wood-like material are assembled, an adhesive is often injected into the opening, or dowel receiving cavity (female member). The dowel (i.e., the male member) is then inserted into the cavity and can be held in place by a friction fit and/or the adhesive. For related technology, please see U.S. Pat. Nos. 6,267,527 and 6,871,681.

Forming a secure dowel joint generally requires among other things, a tight press fit between the dowel (male member) and the sidewalls of the dowel receiving cavity (a complimentarily configured female member or dowel hole) for strong frictional or mechanical bonding, together with a substantially evenly distributed layer of adhesive between the dowel and the sidewalls of the hole for strong chemical bonding.

One of the problems associated with this technique is adequately obtaining a uniform layer of adhesive along the length of the dowel. The tight frictional contact between the sidewalls of the hole and the outer surface of the dowel often interferes with the attempt to form an evenly distributed adhesive layer. Indeed, after the dowel has been inserted, there frequently is an unsightly build up of an adhesive residue around the outer lip of the hole which must in some instances, for example in the manufacture of quality furniture, be removed.

In one prior art approach a liquid resorcinol-formaldehyde resin along with an optional hardener were placed into the dowel receiving cavity followed by insertion of the dowel. Again, this approach often resulted in an uneven distribution of the adhesive between the surfaces of the dowel and the dowel receiving cavity and thus a reduced strength of bonding and also in the expression of excess adhesive from the dowel receiving cavity. Depending on the application (e.g., in the manufacture of fine furniture, or in applications where the surface of the component may come in contact with foods), the expression of the resorcinol-formaldehyde resin adhesive from the dowel receiving cavity may be particularly problematic.

To avoid this problem, it has been suggested (see U.S. Pat. No. 5,338,569-Hatch) to use pre-glued dowels, i.e., dowels that have been coated with a water soluble adhesive or glue. In this approach, water can be applied to the dowel cavity (female member) and the dowel itself also can be pre-moistened to activate (re-solubilize) the glue as the dowel is inserted into the cavity.

In U.S. Patent Application Publication 2008/0115699 an all wood pallet design is described that employs wooden dowels for its assembly.

The present invention focuses on an improved adhesive-coated dowel and a method of using the dowel that facilitates the connection of separate components effectively and efficiently. The adhesive-coated dowel and related method has particular utility in connection with the all wood pallet design of U.S. Patent Application Publication 2008/0115699, the entire disclosure of which is incorporated herein by reference.

SUMMARY OF THE INVENTION

In one embodiment, the present invention provides an adhesive coated dowel having an outer surface and first and second ends wherein the outer surface of the dowel is coated with a B-staged formaldehyde-based resin, such as a B-staged phenol-formaldehyde resin.

In another embodiment, the present invention relates to a method for connecting a dowel to a component part comprising the steps of:
 (A) providing a dowel having an outer surface and first and second ends, the dowel having a coating of a B-staged formaldehyde-based resin on the outer surface;
 (B) providing a component having an opening configured to receive the first end of the dowel so that a surface of the opening contacts a portion of the coated outer surface of the dowel;
 (C) introducing steam into the opening of the component to heat and dampen the surface of the opening;
 (D) inserting the first end of the dowel into the heated and dampened opening in the component to initiate curing of the B-staged formaldehyde-based resin and cause the resin to harden and form an adhesive bond between the surface of the opening and the portion of the coated outer surface of the dowel.

In another embodiment, the present invention relates to a method for connecting component parts together with an adhesive coated dowel comprising the steps of:
 (A) providing a dowel having an outer surface and first and second ends, the dowel having a coating of a B-staged formaldehyde-based resin on the outer surface;
 (B) providing a first component part having a first opening configured to receive the first end of the dowel so that a surface of the first opening contacts a first portion of the coated outer surface of the dowel;
 (C) providing a second component part having a second opening configured to receive the second end of the dowel so that a surface of the second opening contacts a second portion of the coated outer surface of the dowel;
 (D) introducing steam into the first opening of the first component part to heat and dampen the surface of the first opening;
 (E) introducing steam into the second opening of the second component part to heat and dampen the surface of the second opening;
 (F) inserting the first end of the dowel into the heated and dampened first opening in the first component part to initiate curing of the B-staged formaldehyde-based resin and cause the resin to harden and form an adhesive bond between the surface of the first opening and the first portion of the coated outer surface of the dowel; and
 (G) inserting the second end of the dowel into the heated and dampened second opening in the second component part to initiate curing of the B-staged formaldehyde-based resin and cause the resin to harden and form an adhesive bond between the surface of the second opening and the second portion of the coated outer surface of the dowel.

These and other embodiments are set forth in the following description. Still other embodiments will be apparent to those of ordinary skill in the art after consideration of the specification.

DETAILED DESCRIPTION OF THE INVENTION

Figure 1:
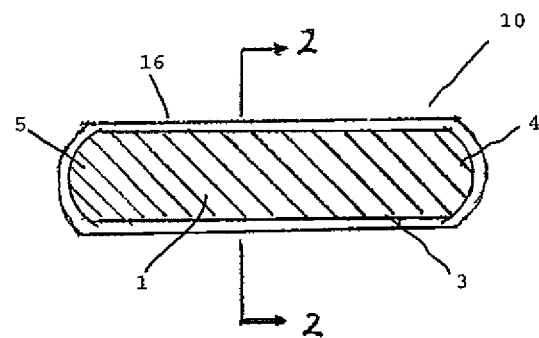
FIG. 1 illustrates a cross section taken length-wise of a dowel with its outer surface coated with a B-staged formaldehyde-based resin, such as a B-staged phenol-formaldehyde resin.

The present invention relates to an adhesive coated dowel and the method of using the adhesive coated dowel for joining separate components together.

The present invention particularly relates to an adhesive coated dowel having an outer surface and first and second ends wherein the outer surface of the dowel is coated with a B-staged (i.e., dried and partially cured) formaldehyde-based resin, such as a B-staged phenol-formaldehyde resin.

The present invention also relates to a method of employing steam in connection with the use of the adhesive coated dowel to join separate component parts together.

Dowels are one of the most common connectors for assembling furniture and other articles made from wood or wood-like materials, such as the all wood pallet of U.S. Patent Application Publication 2008/0115699, the entire disclosure of which is incorporated herein by reference.

The present invention is not limited to any specific dowel design. The prior art is replete with a variety of dowel configurations, including various cross-sections, tapered designs and surface contours (e.g., circumferential grooves), any of which can be treated, in accordance with the present invention, with an aqueous, thermosetting formaldehyde-based resin suitable for B-staging and then heated sufficiently to form a substantially uniform coating of a B-staged formaldehyde-based resin on the external/outer surface of the dowel.

The term "thermosetting formaldehyde-based resin" as used herein refers to resins which irreversibly solidify or "set" when fully cured, such that the fully cured resin cannot be post-formed. Before being fully cured, suitable thermosetting resins typically experience an increase in the viscosity of the resin (i.e., thicken) such that the resin can be transformed from a liquid to a non-dripping, dried form. The resulting dried, but not fully cured form of the resin is typically referred to as a "B-staged resin." The terms "partially cure," "partially cured," "not fully cured" and "B-staged" thus refer to incompletely curing the resin by initiating polymerization and subsequently arresting the polymerization (such as by removing the heat source) before the curable thermosetting resin is fully cured.

Usually, a dowel is symmetrical about its axial midpoint, but need not be. Further, a dowel often is provided with one or more circumferentially-spaced, longitudinally extending grooves or some other type of profiling on the outside of the dowel to facilitate insertion into the dowel receiving cavity and forming a secure bond with each of the component parts being joined. A typical dowel has a longest dimension of between approximately ½ inch and 3 inches, but longer or shorter lengths are possible.

While dowels of the present invention will usually be fabricated from wood; in the broader aspects of the invention, the dowel may be fabricated from any number of materials, including metal and plastic. The material for the dowel will usually be selected based on its desired shear and tensile strength characteristics along with cost considerations.

The dowel is typically inserted into a cylindrical bore, also known as a dowel receiving cavity, a complimentarily configured female member or a dowel hole, which usually has been drilled into the component part in which the dowel is to be inserted for connecting that component to another similarly configured component. The dowel receiving cavity can also have other cross-sectional shapes, such as triangular, rectangular and hexagonal cross-sections and all configurations are embraced by such terms as the bore, dowel receiving cavity, female member or dowel hole. The dowel receiving cavity may extend completely through the component part, in which case it comprises a hole having a side wall (curvilinear) or side walls (non-curvilinear) and no end wall. Alternatively, the dowel receiving cavity will extend only partly into the depth of the component part, in which case it comprises a hole having both a side wall (curvilinear) or side walls (non-curvilinear) and an end wall. In this case, the dowel may be sized and configured so that one end of the dowel mates with the end wall of the dowel receiving cavity. Thus, the dowel (male member) and the dowel receiving cavity (female member) usually are complimentary configured and dimensioned so that there is substantial frictional contact between them over the interfacial area of contact, which interfacial area is defined by between the sidewall (and possible end wall) of the dowel receiving cavity and the outer surface of the dowel.

Figure 2:
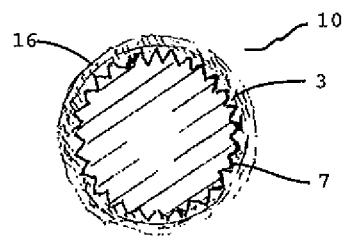
FIG. 2 illustrates a cross section taken width-wise illustrating an alternative embodiment of a dowel with its outer surface coated with a B-staged formaldehyde-based resin, such as a B-staged phenol-formaldehyde resin.

Referring to the FIGS. 1 and 2 of the drawings, an improved dowel is shown which is adapted for insertion into aligned bores of two components, such as two pieces of wood, which are to be connected to each other. As illustrated in these Figures, the dowel 10 comprises a cylindrical piece of wood 1 (though it is to be understood that the invention is not so-limited) having an outer/external surface 3 and first and second ends 4 and 5. As shown in FIG. 2, the outer/external surface 3 of the dowel 10 has circumferentially-spaced, longitudinally extending grooves or flutes 7. The outer/external surface 3 of the dowel 10 also has a coating 16 of a heat activated, B-staged formaldehyde-based resin, such as a B-staged phenol-formaldehyde resin, covering the external/outer surface 3 of the dowel 10.

The heat activated, B-staged resin has been applied in a substantially uniform coating 16 on the external/outer surface 3 of the dowel 10.

Figure 4:
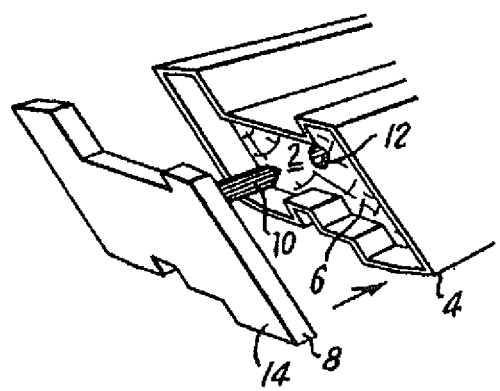
FIG. 4 is an exploded perspective view of joining two component parts together in accordance with the present invention.

FIG. 4 illustrates using the dowel 10 to join component parts. In FIG. 4, the dowel 10 is shown as already having been attached to and extending from component part 14. Dowel 10 is dimensioned to make a firm fit in a tubular hole (dowel receiving cavity) 12 extending into the central portion of the adjoining component part 6. Before inserting the dowel 10 into the dowel receiving cavity 12, steam is introduced, such as by direct injection, into the cavity 12 of component part 6 to heat and moisten the surface of the cavity 12. The surface of the cavity 12 is sufficiently heated and moistened such that when the dowel 10 is inserted into the cavity 12, the residual heat initiates curing of the B-staged resin on the surface of dowel 10 and causes the resin to harden and form an adhesive bond between the mating surfaces of the cavity 12 and the dowel 10.

Formaldehyde-based binder resins suitable for coating the dowel surface and B-staging are available as aqueous solutions and dispersions (e.g., latex), and typically include phenol-formaldehyde (resole) resins, furfural (furfural alcohol)-formaldehyde resins, melamine-formaldehyde resins, phenol-melamine-formaldehyde resins and other similar resins.

One process for making a B-stageable phenol-formaldehyde resin suitable for use in connection with this invention involves reaction of phenol and formaldehyde in an aqueous medium on the basis of about one mole of phenol for each approximately 1.8 to 2.4 moles of formaldehyde, in the presence of a basic catalyst. The formaldehyde is conveniently added as an aqueous solution containing from about 30% to 50% by weight of formaldehyde. The temperatures of the condensation reaction of the formaldehyde with phenol can include those of about from 40° C. to 100° C. An alkaline pH, particularly a relatively high pH such as about 9 to 10.5 and usually a pH of about 9.3 to 10 is employed. The relatively high pH serves to drive the condensation reaction to low levels of free formaldehyde, i.e. uncombined formaldehyde. The condensation reaction is generally indicated by a decrease in the concentrations of formaldehyde and of phenol in the reaction mixture and an increase in the viscosity of the resin.

The resulting aqueous, alkaline resole resin usually is water soluble by virtue of containing large quantities of methylolated phenol residues and generally contains from about 35% to 65% by weight solids, often about 40 to 60% and particularly 45 to 55% by weight solids. Typically, the amount of water in the resin will vary from about 35% to 65%, usually 40% to 60% and particularly 45% to 55%. The resin solids will make up about 90% to about 95% of the total solids content in the resin. The amount of solids is assessed by standard industry methods, for example the standard oven solids test. B-stagable resins of this invention are referred to as aqueous in view of the use of water as solvent for the solids therein.

Typically, the amount of basic catalyst used in preparing the formaldehyde-based resin, and particularly the phenol-formaldehyde resole resins, varies from about 0.01 to about 1 mole of catalyst for each mole of phenol and usually from about 0.1 to 0.7 moles of the alkaline catalyst per mole of phenol.

Illustrative of the catalyst there can be mentioned oxides and hydroxides of alkali metals, alkaline earth metals, tertiary amines and mixtures thereof. Usually the catalyst includes sodium hydroxide, potassium hydroxide or triethylamine.

To B-stage, i.e., dry and partially cure such resins, very little, or generally no, cure catalyst is added to the aqueous resin composition used to coat the dowel. The resin can be dried and B-staged at a temperature between 300 and 350° F. (149-177° C.) for a short period of time, e.g., 5 seconds to 2 minutes. Longer times at lower temperatures also can be used, though a temperature at least above about 230° F. (110° C.) is desirable.

Again, suitable phenol-formaldehyde resins for B-staging usually are supplied as an aqueous composition often containing from 10 to 60% by weight solids.

A particularly useful phenol-formaldehyde resole resin can be prepared by reacting substantially the full complement of phenol with two or more and usually three additions of formaldehyde and alkaline catalyst (e.g., sodium hydroxide). The resin is prepared at a formaldehyde to phenol (F:P) mole ratio of between 1.8 and 2.4 using 0.1 to 0.7 moles of the alkaline catalyst per mole of phenol In particular, to substantially the full quantity of phenol, one first introduces between 15 and 25% by weight of the full complement of formaldehyde to be used and then the reaction is initiated by added between 20 and 30% by weight of the full complement of the alkaline catalyst to be used. The reaction is allowed to progress at a temperature of 75-90° C. and held at that temperature for between 15 and 30 minutes. Then, a second amount of formaldehyde is added (between 30 and 40% by weight of the full complement of formaldehyde to be used) over a period of about 10 to 20 minutes. The reaction is allowed to exotherm to a higher temperature approaching 100° C., is held at that temperature for a period of 30 to 50 minutes and then is gradually cooled over about 10 to 20 minutes to a temperature of 75-90° C. This processing is then followed by a second amount of catalyst (between 20 and 30% by weight of the full complement of the alkaline catalyst to be used), which in turn is followed by the third charge of formaldehyde. The remaining formaldehyde (between 40 and 50% by weight of the full complement of formaldehyde to be used) is added over a period of about 15 to 25 minutes and the reaction is again allowed to exotherm over a period of 5 to 15 minutes to a higher temperature approaching 100° C. and held at the higher temperature for an additional period of 5 to 15 minutes.

The reaction mixture then can be cooled, a formaldehyde scavenger, such as urea, can be added; followed by the final charge of the alkaline catalyst. Usually, between about 40 and 50% by weight of the full complement of catalyst to be used is added. The reaction mixture then is advanced to a desired viscosity, usually a Gardner-Holdt viscosity of W to X and additional water may also be added to adjust the solids content as desired to about 45% by weight.

An aqueous formaldehyde-based resin suitable for B-staging can be applied to the external/outer surface 16 of the dowel 10 by any method known and used in the art of applying a thin (and in some embodiments uniform i.e., substantially evenly distributed) coating of liquid material to an item. Such coating methods broadly include dipping, spraying, painting, roll coating, padding and other coating techniques.

One suitable coating technique is to mix a plurality of dowels with an aqueous formaldehyde-based resin suitable for B-staging in a tumbling mixer, similar in configuration to a cement mixer, which is fitted for external or internal heating, possibly with air circulation, to achieve suitable drying and B-staging of the aqueous formaldehyde resin as the dowels are agitated. In this way, dowels are formed with a thin, uniform coating of the heat activated, B-staged formaldehyde-based resin adhesive over the external/outer surface of the dowel that is intended to mate with the interface area of the related dowel receiving cavity.

In accordance with the present invention, the heat activated, B-staged formaldehyde-based resin-pre-coated dowels are inserted into dowel receiving bores in the component parts, such as two pieces of wood, that are to be secured together. The method of using the resin pre-coated dowels comprises first introducing steam, including superheated steam, into the bores, to moisten and pre-heat the surface of the bore. The steam can be introduced into the bore by placing the component part into an atmosphere of steam or usually by directly injecting steam into the bore. Thereafter, before excessive cooling occurs, the resin pre-coated dowels are inserted into the heated and moistened bores. The heat activated, B-staged formaldehyde-based resin coating on the external/outer surface of the dowel is activated by the heat and residual moisture in the bores to initiate curing and then firmly and uniformly adhere the dowel to the internal surface of the bore as the resin hardens during cure.

A strong adhesive bond is achieved without the complications arising from prior art methods in which the adhesive is injected into the bores prior to the insertion of the dowels in the bores.

The dowels of the present invention are easily and inexpensively made by forming a dowel of any convenient shape and applying a coating of an aqueous formaldehyde-based resin, such as a phenol-formaldehyde (resole) resin suitable for B-staging on the external/outer surface of the dowel.

It will be understood that while the invention has been described in conjunction with specific embodiments thereof, the foregoing description and examples are intended to illustrate, but not limit the scope of the invention.

EXAMPLES

Example 1

B-Stagable Phenol-Formaldehyde Resin

A suitable, thermosetting, B-stagable phenol-formaldehyde resin can be synthesized at a formaldehyde to phenol (F/P) mole ratio of about 2.1 as follows.

To a suitable reactor equipped with an agitator, heating/cooling coils and a vacuum system, 23.7 parts by weight phenol are added, followed by 6 parts by weight of a 50% by weight solution of formaldehyde and 14.6 parts by weight water. A small amount of a defoamer also may be added to the reaction mixture and then the temperature is adjusted to 45° C. With continued agitation, the condensation reaction is then initiated by the addition of a 50% by weight solution of caustic (sodium hydroxide) to the reaction mixture. In particular, 3.1 parts by weight of the 50% by weight solution of caustic are added gradually over 20 minutes and the reaction mixture is allowed to exotherm to 81° C. At this point, an additional 12.1 parts by weight of a 50% by weight solution of formaldehyde are added over 15 minutes while allowing the reaction mixture to exotherm further to 97° C. The reaction is then held at that temperature for an additional 40 minutes and thereafter cooled to 81° C. gradually over 10 minutes. Then, an additional 2.9 parts by weight of a 50% by weight solution of caustic (sodium hydroxide) are added to the reaction mixture over a 5 minute period while the temperature is maintained at 81° C. and thereafter another 13.6 parts by weight of a 50% by weight solution of formaldehyde are added over an additional 20 minutes while the temperature is still maintained at 81° C. Following these additions of caustic and formaldehyde, the reaction mixture is allowed to exotherm to 92° C. over 10 minutes and then held at 92° C. for 10 additional minutes. The reaction mixture is cooled to 85° C. and 5 parts by weight urea (as a formaldehyde scavenger) are added, followed by the addition of 7.5 parts by weight water. Once the reaction mixture, still at a temperature of 85° C., has advanced to a Gardner-Holdt viscosity of a TU to U, an additional 5 parts by weight of a 50% by weight solution of caustic (sodium hydroxide) is added to the reaction mixture over 11 minutes. While closely monitoring the viscosity of the reaction mixture, the viscosity is advanced to a Gardner-Holdt viscosity of a W to WX and then the reaction mixture is cooled to 56° C., using a combination of vacuum and cooling coils. The reaction mixture has a target solids concentration of 43% by weight.

Example 2

Strength of Dowel Joints

Holes were drilled into wooden blocks (2 inches×2 inches) to form identically sized dowel receiving cavities. Dowels having the same size and shape were obtained, half of which were provided with a thin coating of a B-staged phenol-formaldehyde resin of the type described in Example 1. In one set of tests (dowel), uncoated dowels were inserted into the dowel receiving cavities. In a second set of tests (steamed dowel), the dowel receiving cavities were first steamed before inserting the uncoated dowels. In a third set of tests (glued), the B-staged phenol-formaldehyde resin-coated dowels were inserted into the dowel receiving cavities. In a fourth and final set of tests (glued+steamed), the dowel receiving cavities were first steamed before inserting the B-staged phenol-formaldehyde resin-coated dowels into the dowel receiving cavities. The dowels all were inserted in a similar manner using a cold press.

Figure 3:
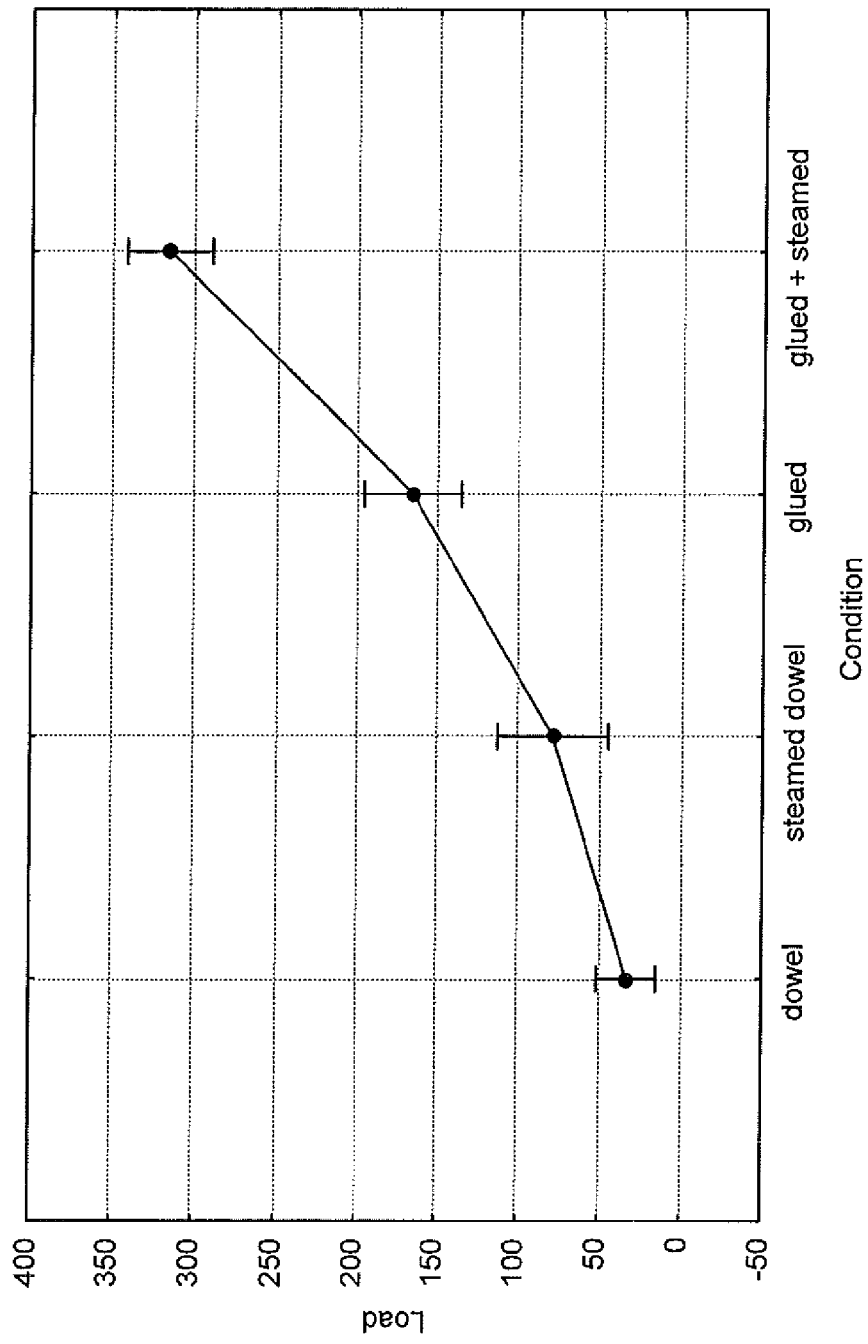
FIG. 3 presents data obtained upon evaluating the bonding strengths of a various methods of connecting a dowel to a component part.

Thereafter, the blocks with the connected dowels were mounted onto an Instron Testing machine and the load required for pulling the dowel from each wooden block was measured. FIG. 3 illustrates the results of the testing. As shown, the method of the present invention provided the strongest connection.

The present invention discloses.

In a further embodiment, the present invention is:

An adhesive coated dowel comprising a dowel substrate having an outer surface and first and second ends wherein the outer surface of the dowel substrate is coated with a B-staged formaldehyde-based resin.

A method for connecting an adhesive coated dowel to a component part comprising the steps of:
  (A) providing a dowel having an outer surface and first and second ends, the dowel having a coating of a B-staged formaldehyde-based resin on the outer surface;
  (B) providing a component having an opening configured to receive the first end of the dowel so that a surface of the opening contacts a portion of the coated outer surface of the dowel;
  (C) introducing steam into the opening of the component to heat and dampen the surface of the opening;
  (D) inserting the first end of the dowel into the heated and dampened opening in the component to initiate curing of the B-staged formaldehyde-based resin and cause the resin to harden and form an adhesive bond between the surface of the opening and the portion of the coated outer surface of the dowel.

A method for connecting component parts together with an adhesive coated dowel comprising the steps of:
  (A) providing a dowel having an outer surface and first and second ends, the dowel having a coating of a B-staged formaldehyde-based resin on the outer surface;
  (B) providing a first component part having a first opening configured to receive the first end of the dowel so that a surface of the first opening contacts a first portion of the coated outer surface of the dowel;
  (C) providing a second component part having a second opening configured to receive the second end of the dowel so that a surface of the second opening contacts a second portion of the coated outer surface of the dowel;
  (D) introducing steam into the first opening of the first component part to heat and dampen the surface of the first opening;

(E) introducing steam into the second opening of the second component part to heat and dampen the surface of the second opening;

(F) inserting the first end of the dowel into the heated and dampened first opening in the first component part to initiate curing of the B-staged formaldehyde-based resin and cause the resin to harden and form an adhesive bond between the surface of the first opening and the first portion of the coated outer surface of the dowel; and (G) inserting the second end of the dowel into the heated and dampened second opening in the second component part to initiate curing of the B-staged formaldehyde-based resin and cause the resin to harden and form an adhesive bond between the surface of the second opening and the second portion of the coated outer surface of the dowel.

A phenol-formaldehyde resole resin prepared by reacting substantially a full complement of phenol with two or more additions of a full complement of formaldehyde and two or more additions of a full complement of alkaline catalyst; wherein the resole resin is prepared at a formaldehyde to phenol (F:P) mole ratio of between 1.8 and 2.4 using 0.1 to 0.7 moles of the alkaline catalyst per mole of phenol.

The adhesive coated dowel according to any of the previous paragraphs, wherein the B-staged formaldehyde-based resin is a B-staged phenol-formaldehyde resin The phenol-formaldehyde resole resin according to any of the previous paragraphs, wherein a first amount of formaldehyde comprises between 15 and 25% by weight of the full complement of formaldehyde to be used a first amount of alkaline catalyst comprises between 20 and 30% by weight of the full complement of the alkaline catalyst to be used.

The phenol-formaldehyde resole resin according to any of the previous paragraphs, wherein a second amount of formaldehyde comprises between 30 and 40% by weight of the full complement of formaldehyde to be used and a second amount of alkaline catalyst comprises between 20 and 30% by weight of the full complement of the alkaline catalyst to be used.

The phenol-formaldehyde resole resin according to any of the previous paragraphs, wherein a third amount of formaldehyde and a third amount of catalyst is added.

The phenol-formaldehyde resole resin according to any of the previous paragraphs, wherein after the addition of the first amount of alkaline catalyst, the reaction is allowed to progress at a temperature of 75-90° C. for between 15 and 30 minutes.

The phenol-formaldehyde resole resin according to any of the previous paragraphs, wherein after the second amount of formaldehyde is added the reaction is allowed to exotherm to a higher temperature approaching 100° C. and, is held at that temperature for a period of 30 to 50 minutes and then gradually cooled over about 10 to 20 minutes to a temperature of 75-90° C.

The phenol-formaldehyde resole resin according to any of the previous paragraphs, wherein the second amount of catalyst and the third amount of formaldehyde is added and the reaction is again allowed to exotherm to a higher temperature approaching 100° C.

The present invention has been described with reference to specific embodiments. However, this application is intended to cover those changes and substitutions that may be made by those skilled in the art without departing from the spirit and the scope of the invention. Unless otherwise specifically indicated, all percentages are by weight. Throughout the specification and in the claims the term "about" is intended to encompass + or −5% and typically the variation is only about + or −2%.

We claim:

1. An adhesive coated dowel, comprising:
   a dowel substrate having an outer surface, a first end, and a second end, wherein the dowel substrate has a length of about 0.5 inches to about 3 inches and circumferentially-spaced, longitudinally extending flutes disposed therein between the first end and the second end; and
   a B-staged formaldehyde-based resin coated on the outer surface of the dowel substrate, wherein the B-staged formaldehyde-based resin is a thermosetting resin, and wherein the B-staged formaldehyde-based resin was produced from a formaldehyde-based resin heated to a temperature of greater than 110° C. and to about 177° C.

2. The adhesive coated dowel of claim 1, wherein the B-staged formaldehyde-based resin comprises a B-staged phenol-formaldehyde resin.

3. The adhesive coated dowel of claim 2, wherein the B-staged phenol-formaldehyde resin was prepared with a formaldehyde to phenol (F:P) molar ratio of about 1.8 to about 2.4.

4. The adhesive coated dowel of claim 2, wherein the B-staged phenol-formaldehyde resin was prepared with about 0.01 mol to about 1 mol of an alkaline catalyst per mol of phenol.

5. The adhesive coated dowel of claim 4, wherein the alkaline catalyst comprised an alkali metal hydroxide, an alkaline earth metal hydroxide, a tertiary amine, or any mixture thereof.

6. The adhesive coated dowel of claim 2, wherein the B-staged phenol-formaldehyde resin was prepared with about 0.1 mol to about 0.7 mol of an alkaline catalyst per mol of phenol, and wherein the alkaline catalyst comprised sodium hydroxide, potassium hydroxide, trimethylamine, or any mixture thereof.

7. The adhesive coated dowel of claim 1, wherein the dowel substrate is fabricated from wood.

8. The adhesive coated dowel of claim 1, wherein the dowel substrate is fabricated from plastic or metal.

9. The adhesive coated dowel of claim 1, wherein the B-staged formaldehyde-based resin comprises a furfural-formaldehyde resin.

10. The adhesive coated dowel of claim 1, wherein the B-staged formaldehyde-based resin comprises a melamine-formaldehyde resin.

11. The adhesive coated dowel of claim 1, wherein the B-staged formaldehyde-based resin comprises a phenol-melamine-formaldehyde resin.

12. The adhesive coated dowel of claim 1, wherein the formaldehyde-based resin was heated to a temperature of about 149° C. to about 177° C. for a time period of about 5 seconds to about 2 minutes to produce the B-staged formaldehyde-based resin.

13. An adhesive coated dowel, comprising:
   a dowel substrate having an outer surface and a first end opposite a second end, wherein the dowel substrate has a length of about 0.5 inches to about 3 inches, and wherein the dowel substrate has circumferentially-spaced, longitudinally extending flutes; and
   a B-staged formaldehyde-based resin coated on the outer surface of the dowel substrate, wherein the B-staged formaldehyde-based resin comprises a phenol-formaldehyde resin, a furfural-formaldehyde resin, a melamine-formaldehyde resin, a phenol-melamine-formaldehyde resin, or any mixture thereof.

14. The adhesive coated dowel of claim 13, wherein the dowel substrate is fabricated from wood.

15. The adhesive coated dowel of claim 13, wherein the dowel substrate is fabricated from plastic or metal.

16. The adhesive coated dowel of claim 13, wherein the B-staged formaldehyde-based resin comprises a B-staged phenol-formaldehyde resin, and wherein the B-staged phenol-formaldehyde resin was prepared with a formaldehyde to phenol (F:P) molar ratio of about 1.8 to about 2.4.

17. The adhesive coated dowel of claim 13, wherein the B-staged formaldehyde-based resin was prepared with an alkaline catalyst, wherein the alkaline catalyst comprised an alkali metal hydroxide, an alkaline earth metal hydroxide, a tertiary amine, or any mixture thereof.

18. The adhesive coated dowel of claim 17, wherein the alkaline catalyst comprised sodium hydroxide, potassium hydroxide, trimethylamine, or any mixture thereof.

19. The adhesive coated dowel of claim 13, wherein the dowel substrate is fabricated from wood, and wherein the B-staged formaldehyde-based resin was produced from a formaldehyde-based resin heated to a temperature of about 149° C. to about 177° C. for a time period of about 5 seconds to about 2 minutes.

20. An adhesive coated dowel, comprising:
  a dowel substrate having an outer surface and a first end opposite a second end, wherein the dowel substrate has a length of about 0.5 inches to about 3 inches, wherein the dowel substrate is fabricated from wood, and wherein the dowel substrate has circumferentially-spaced, longitudinally extending flutes disposed therein and between the first end and the second end; and
  a B-staged phenol-formaldehyde-based resin coated on the outer surface of the dowel substrate, wherein:
    the B-staged formaldehyde-based resin is dried and at least partially cured,
    the B-staged phenol-formaldehyde resin was prepared with a formaldehyde to phenol (F:P) molar ratio of about 1.8 to about 2.4,
    the B-staged formaldehyde-based resin was produced from a formaldehyde-based resin heated at a temperature of greater than 110° C. and to about 177° C.,
    the B-staged phenol-formaldehyde resin was prepared with about 0.1 mol to about 0.7 mol of an alkaline catalyst per mol of phenol,
    the B-staged formaldehyde-based resin is a thermosetting resin, and
    the alkaline catalyst comprised an alkali metal hydroxide, an alkaline earth metal hydroxide, a tertiary amine, or any mixture thereof.

* * * * *